May 4, 1937. E. S. WINN 2,079,138
OUTDOOR BATTERY BROODER WINDOW
Original Filed Dec. 2, 1932
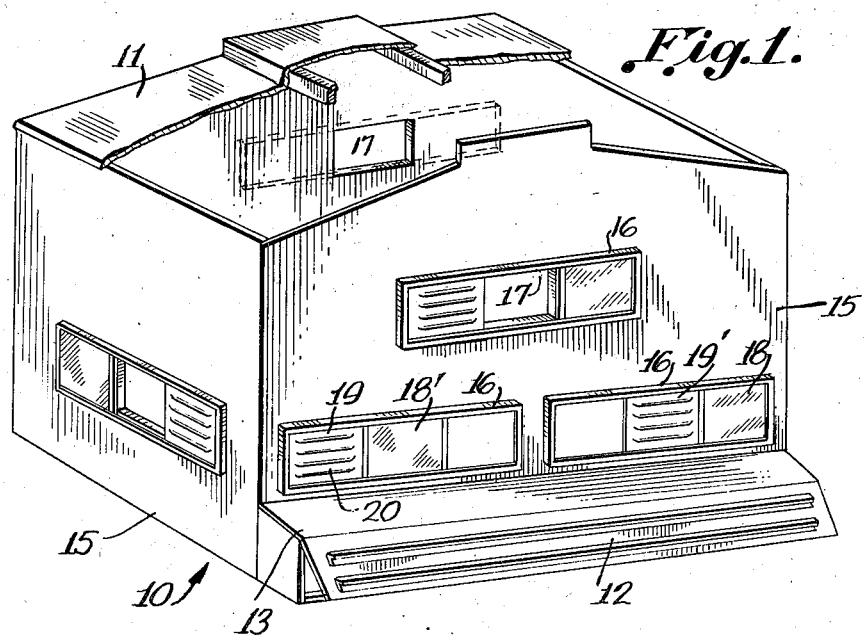
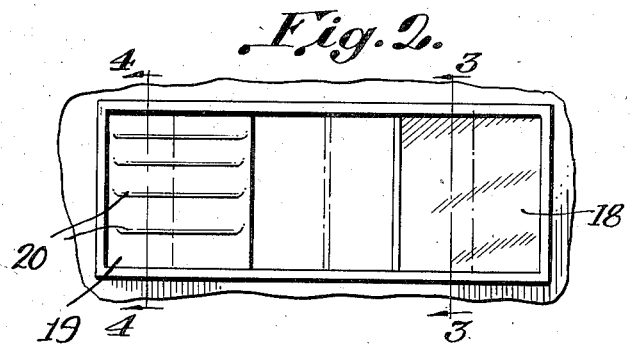
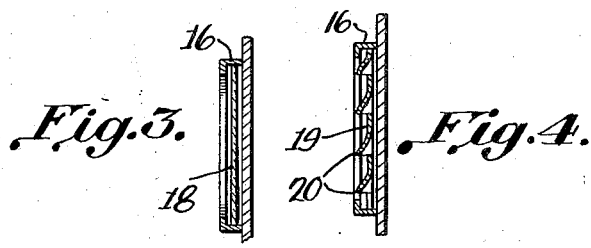
INVENTOR.
Elisha S. Winn.
BY Miller & Miller,
ATTORNEYS.

Patented May 4, 1937

2,079,138

UNITED STATES PATENT OFFICE 2,079,138

OUTDOOR BATTERY BROODER WINDOW

Elisha S. Winn, Fitzgerald, Ga.

Original application December 2, 1932, Serial No. 645,460. Divided and this application July 10, 1936, Serial No. 89,977

4 Claims. (Cl. 98—88)

This invention relates to a brooder ventilator window and is a division of application Serial No. 645,460, filed December 2, 1932, and patented October 6, 1936, No. 2,056,814.

It is an object of this invention to provide a ventilator window especially intended for the particular outdoor battery brooder disclosed and claimed in the aforementioned patent application, the particular window ventilator of this invention, however, being equally servicable in outdoor battery brooders of any nature.

The particular object of this invention is to provide a window which will serve as a means of light and of ventilation, which ventilation is controllable to a greater or lesser degree as desired. Furthermore it provides complete protection against rain or wind, yet prevents the baby chicks or other fowl from escaping therethrough. It may be easily opened for servicing the chicks and for operation of the several features within the brooder, allowing access thereto, as set forth in Patent No. 2,056,814; at the same time, it affords a doorway or passage way for the chicks when they are to be given access to the yard by a runway from the brooder.

As a further feature of this invention, the window ventilator hereof is not necessarily limited to a brooder for chickens but is equally servicable for use in all types of farm out-houses wherever it may be found desirable to control the ventilation and light thereto.

With the foregoing and other objects in view as will hereinafter become apparent, this invention comprises the construction, combination and arrangement of parts hereinafter disclosed, claimed and illustrated in the accompanying drawing, wherein:

Fig. 1 is a full sectional view, partly broken away of the battery brooder to which this invention has been applied.

Fig. 2 is an enlarged front elevational view of the window ventilator of this invention, and Figs. 3 and 4 are section views on lines 3—3 and 4—4 of Fig. 2.

Here is shown at 10 an outdoor battery brooder to which this invention has been applied. This battery brooder includes the roof 11 and a feed hopper 12, the top 13 of which serves as a runway for the baby chicks to gain access to the passage way provided into the battery brooder 10 through the ventilator window constituting this invention. As will be apparent from Fig. 1 and from the application of which the present application is a division, the walls 15 of the brooder 10 are provided with a plurality of ventilator windows constituting this invention. This window consists of a flanged framework 16, placed on the outside of a wall 15 of the brooder 10, and on both sides of the window opening 17. A panel 18 is provided for the flanged framework 16 on one side of the window opening 17, and a metal ventilator 19, having downwardly turned louvers 20, is provided in the other end of the framework 16.

As shown in full outline in Fig. 2, the ventilator may be placed at one end, while the glass panel 18 may be slid to the opposite end, leaving the window 17 entirely open and suitable to serve as a passageway at least where it is located adjacent to the top 13 of the feeder hopper 12. The light and ventilation may be controlled to any desired degree. Thus both the glass panel 18 and the metal ventilator 19 may be moved partially over the window opening 17, so as to give a small amount of ventilation and still allow some light. As shown in Figure 1, the glass panel 18 may be moved to position 18' at times, allowing light without ventilation, while, as shown in the same figure, the metal ventilator may be moved to position 19' at times, allowing ventilation and no light, through the window opening.

Having thus set forth and disclosed the nature of this nvention, what is claimed is:—

1. In an outdoor battery brooder, a brooder wall, a controllable ventilating means for said wall, said means comprising a window frame on said brooder wall, a window opening through said wall of said brooder within said window frame, a metal ventilator slidable in said window frame to one side of said window opening, and a glass panel in said window frame slidable to the other side of said window opening.

2. A controllable ventilating means for use on a wall having a window opening therein, said means comprising a window frame extending beyond both sides of the window opening, a metal ventilator, slidable in said window frame to one side of said window opening, and a glass panel in said window frame, slidable to the other side of said window opening.

3. A controllable ventilating means for use on a wall having a window opening therein, said means comprising a window frame extending beyond both sides of the window opening, a metal ventilator, slidable in said window frame to one side of said window opening, and a glass panel in said window frame, slidable to the other side of said window opening, said window frame having internally extending flanges to provide grooves for guiding said glass panel and said ventilator.

4. A controllable ventilating means for use on a wall having a window opening therein, said means comprising a window frame extending beyond both sides of the window opening, a metal ventilator, slidable in said window frame to one side of said window opening, and a glass panel in said window frame, slidable to the other side of said window opening, said window frame having internally extending flanges to provide grooves for guiding said glass panel and said ventilator, a plurality of parallel downwardly extending louvers in said metal ventilator through which air may pass when said ventilator is in front of said window opening.

ELISHA S. WINN.